United States Patent [19]

Hurd

[11] Patent Number: 6,125,334

[45] Date of Patent: Sep. 26, 2000

[54] MODULE-CONFIGURABLE FULL-CHIP POWER PROFILER

[75] Inventor: Linda L. Hurd, Sugarland, Tex.

[73] Assignee: Texas Instruments Incorporated, Dallas, Tex.

[21] Appl. No.: 09/066,620

[22] Filed: Apr. 24, 1998

Related U.S. Application Data

[60] Provisional application No. 60/046,811, May 2, 1997.

[51] Int. Cl.[7] ................................................ G06F 1/00
[52] U.S. Cl. .................................... 702/60; 703/22
[58] Field of Search .............................. 702/60; 703/22, 703/26; 712/223, 227

[56] References Cited

U.S. PATENT DOCUMENTS

| | | | |
|---|---|---|---|
| 5,535,370 | 7/1996 | Raman et al. . | |
| 5,557,557 | 9/1996 | Frantz et al. . | |
| 5,754,435 | 5/1998 | Sato | 364/480 |
| 5,913,052 | 6/1999 | Beatty et al. | 395/500 |
| 5,930,147 | 7/1999 | Takei | 364/488 |
| 5,941,991 | 8/1999 | Kageshima | 713/340 |
| 5,949,689 | 9/1999 | Olson et al. | 364/488 |
| 6,002,878 | 12/1999 | Gehman et al. | 395/750.08 |

OTHER PUBLICATIONS

Tiwari et al., "Instruction Level Power Analysis and Optimization of Software", IEEE, Jul. 1995.

Mehta et al., "Instruction Level Power Profiling", IEEE, Mar. 1996.

Lee et al., "Power Analysis and Low–Power Scheduling Techniques for Embedded DSP Software", IEEE, May 1995.

Mike Tien–Chien Lee, Tiwari, Sharad Malik and Masahiro Fujito, "Power Analysis and Minimization Techniques for Embedded DSP Software," IEEE Transactions on Very Large Scale Integration (VLSI) Systems, vol. 5, No. 1, Mar. 1997.

Toshinori Sato, Masato Nagamatsu, Haruyuki Tago, "Power and Performance Simulator: ESP and its Application for 100MIPS/W Class RISC Design," IEEE Symposium on Low Power Electronics 1994.

Paul E. Landman and Jan M. Rabaey, "Activity–Sensitive Architectural Power Analysis," IEEE Transactions on Computer–Aided Design of Integrated Circuits and Volumes, vol. 15, No. 6, Jun. 1996.

Vivek Tiwari, et al. "Power Analysis of Embedded Sotware: A First Step Towards Software Power Minimization," IEEE Trans. on VLSI Systs., vol. 2, No. 4, Dec. 1994.

Hirotsugu Kojima, et al., "Power Analysis of a Programmable DSP for Architecture/Program Optimization", ICSPAT Conf. 1995.

T. Sato, et al., "Evaluation of Architecture–Level Power Estimation for CMOS RISC Processors," 1995 IEEE Symposium on Low Power Electronics.

*Primary Examiner*—Patrick Assouad
*Attorney, Agent, or Firm*—J. Dennis Moore; Wade James Brady, III; Frederick J. Telecky, Jr.

[57] ABSTRACT

A method for determining the power consumption, resulting from execution of a block of code, of an integrated circuit that includes a processor module and one or more other circuit modules. The method involves the steps of, first, providing a set of average current values for each of said modules, for a predetermined plurality of sets of conditions based on predetermined sets of signal line states associated with said module, for each instruction in the instruction set of said processor module, said sets of conditions being selected for dominant power consumption effect on the module. For each module, for each instruction in a block of code to be executed on said processor module, a set of signal line states is generated, associated with said module, for each processor cycle, in sequence. The generated set of signal line states are then tested for said set of conditions. One of said average current values is assigned for each condition so tested that is met. Finally, the running total of said average current values so met is accumulated for each such processor cycle. The average current values can be translated for different frequencies and supply voltages. Also, average current can be converted to average power consumption.

40 Claims, 5 Drawing Sheets

MODULE-CONFIGURABLE FULL-CHIP POWER PROFILER

This application claims priority under 35 USC § 119(e)(1) of provisional application Ser. No. 60/046,811, filed May 2, 1997.

TECHNICAL FIELD OF THE INVENTION

This invention relates to power profilers, and more particularly relates to a power profiler for integrated circuits including one or more microprocessors, wherein the profiler provides power data at an instruction level, for software instruction optimization for low power.

BACKGROUND OF THE INVENTION

Low power optimization in the area of integrated circuits ("ICs") is a known goal. Numerous tools exist for IC designers, including designers of microprocessors, to optimize their designs for low power. In addition, tools have been described to assist programmers of software to be executed on microprocessors to optimize instruction selection for low power.

For example, in an article entitled, "Power Analysis of Embedded Software: A First Step Towards Software Power Minimization," by Vivek Tiwari, et al., IEEE Trans. on VLSI Systs., Vol. 2, No. 4, December, 1994, a methodology is proposed for instruction level power modeling in which the current drawn by a microprocessor is measured. The authors suggest that simulation based power analysis tools might be used in generating CPU models, without indicating how that might be done in any practical scale. In fact, for embedded system design the authors pointed out problems they believed would exist in attempting such an approach. Instead, the authors recommended a methodology based on laboratory measurements of CPU power consumption during execution of selected instructions. Based on such measurements, the authors propose a model in which the total IC power consumption is broken down into components such as "base energy cost," "inter-instruction effects," "effects of resource constraints," etc. These components are provided for each instruction in a program, and summed, to yield an estimated power consumption for the program.

In a subsequent article entitled, "Power Analysis of a Programmable DSP for Architecture/Program Optimization," by Hirotsugu Kojima, et al., ICSPAT Conf., 1995, the authors propose a power modeling methodology based on power analysis of a digital signal processor ("DSP") using switch level and cell based simulation. The authors draw certain conclusions in their paper about relative contributions to overall power consumption of the DSP under analysis of, e.g., clock and bus circuits vs. data path. No proposals are made as to practical application of any results to software optimization, however.

In U.S. Pat. No. 5,557,557, entitled "Processor Power Profiler," which issued on Sep. 17, 1996, to Gene A. Frantz, et al., and which is commonly assigned, a method is presented for determining the energy consumption of a processor when executing a program. The method is embodied in a power profiler program, and initially selects the processor which will execute the program. It then creates a model of energy used by the processor as a function of a plurality of instructions operable by the processor. The model is constructed based on measurements of the processor current taken under various controlled conditions. The program whose energy consumption is to be determined is then executed using the energy model to determine the energy consumption of the program on the processor. The energy model relates information regarding instruction opcodes, data values, processor environment, etc., to power data provided by a processor simulator or evaluator program, and adds the power data. The method groups certain instructions by common power considerations, and so partitioning of instructions is done in an early phase of the method, to take advantage of this grouping.

The patent to Frantz, et al. provides an excellent method for power analysis of a microprocessor at the instruction level. However, there is a desire for a method for power analysis of a microprocessor with expanded capabilities, for even greater accuracy.

SUMMARY OF THE INVENTION

According to the principles of the present invention, a method is provided for determining the power consumption, resulting from execution of a block of code, of an integrated circuit that includes a processor module and one or more other circuit modules. The method involves the steps of, first, providing a set of average current values for each of said modules, for a predetermined plurality of sets of conditions based on predetermined sets of signal line states associated with said module, for each instruction in the instruction set of said processor module, said sets of conditions being selected for dominant power consumption effect on the module. For each module, for each instruction in a block of code to be executed on said processor module, a set of signal line states is generated, associated with said module, for each processor cycle, in sequence. The generated set of signal line states are then tested for said set of conditions. One of said average current values is assigned for each condition so tested that is met. Finally, the running total of said average current values so met is accumulated for each such processor cycle.

The average current values can be translated for different frequencies and supply voltages. Also, average current can be converted to average power consumption.

Thus, the present invention provides a method for power analysis of an integrated circuit that includes a processor module, at the sub-block level. The present invention allows instruction-level power profiling and, for processors with parallelized architectures, execute-packet level power profiling. The analysis may be done on a cycle-by-cycle basis. Further, the power components are provided on an algorithm basis, as compared with prior art look-up table basis. This provides greatly expanded capabilities over prior art methods, including modeling of sensitivities due to different types of instructions, use of different functional units, internal switching activity, effects of other instructions in the pipeline, varying degrees of parallelism, changes in data operands, and conditional execution.

These and other features and advantages of the invention will be apparent to those skilled in the art from the following detailed description of the invention, taken together with the accompanying drawings.

DETAILED DESCRIPTION OF THE PREFERRED EMBODIMENT

Figure 1:
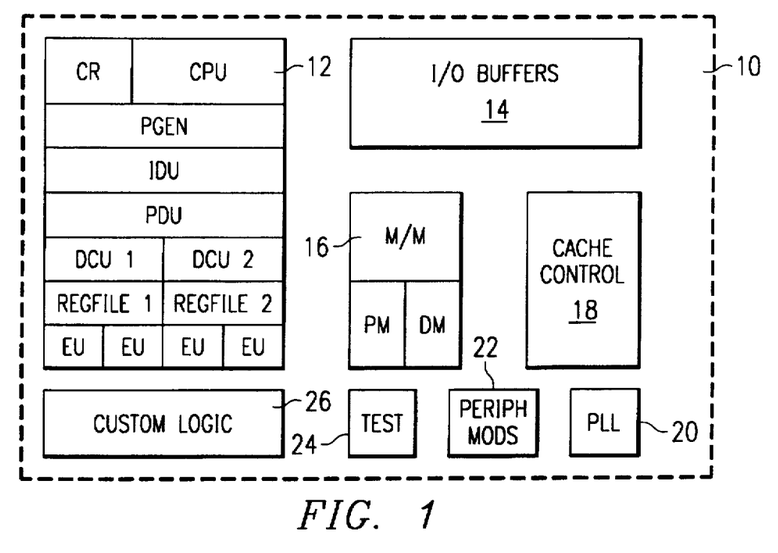
FIG. 1 is a block diagram of a multi-module integrated circuit that includes a processor module.

FIG. 1 is a block diagram of a highly integrated circuit ("IC") 10 implemented in complementary metal oxide semiconductor ("CMOS") technology, for which it is desired to know power consumption, as a function of the execution of a given instruction set. The IC 10 includes several modules: a central processing unit ("CPU") core 12, input-output ("I/O") buffers 14, memory modules 16 which include Program Memory PM and Data Memory DM, a cache control unit 18, a phase lock loop ("PLL") clocking unit 20, various peripheral modules 22, a test unit 24 including scan and boundary scan circuitry, and customizing logic unit 26 which contains logic for customizing the IC 10 for a particular application.

The CPU 12 includes various units, such as a program generator unit PGEN, an instruction dispatch unit IDU, predecoder unit PDU, first and second decoder units DCU 1, DCU 2, two register files REGFILE 1, REGFILE 2, two or more execution units EU associated with each of the register files, and various other control and test-related units, such as control registers CR, clock generation units and buffers DTP_CCU, and emulation circuitry MTAP, represented collectively as CR in FIG. 1.

The circuit design of IC 10 utilizes conventional master/slave latching, driven by conventional master/slave clock signals. The particular architecture and circuit methodology of a given IC for which it is desired to know power consumption are not critical to the application of the principles of the present invention. The present invention is applicable to a wide variety of circuitry, as will be appreciated after the principles, presented hereinbelow, are understood. For purposes of description hereinbelow, it is assumed that the IC 10 under consideration is a customizable IC utilizing a CPU 12 core that is a Texas Instruments ® TMS320C60 digital signal processor ("DSP"). This processor core has a very large instruction word ("VLIW") architecture, capable of processing up to eight instructions per clock cycle, and it utilizes two data paths, with two REGFILEs and two sets of EUs.

The preferred embodiment of the present invention provides a method for generating an accurate estimate of the power consumption of IC 10 as a function of the execution of instructions from the instruction set of the CPU 12. This, in turn, permits the optimization for low power operation of IC 10 of a block of code, or program, to be executed on CPU 12. Very broadly, the method involves determining the current flow to the individual modules of IC 10 using a simulation tool, and analyzing power consumption, for the various instructions in the instruction set of CPU 12. From the data so generated, an algorithm is generated for each module that can operate in conjunction with, e.g., an instruction-level simulator, or a behavioral/logic simulator (e.g., Quick HDL®), or a Quick Turn Box/environment, to provide accurate modeling of power consumption as a function of the instructions in the block of code under consideration.

Figure 2:
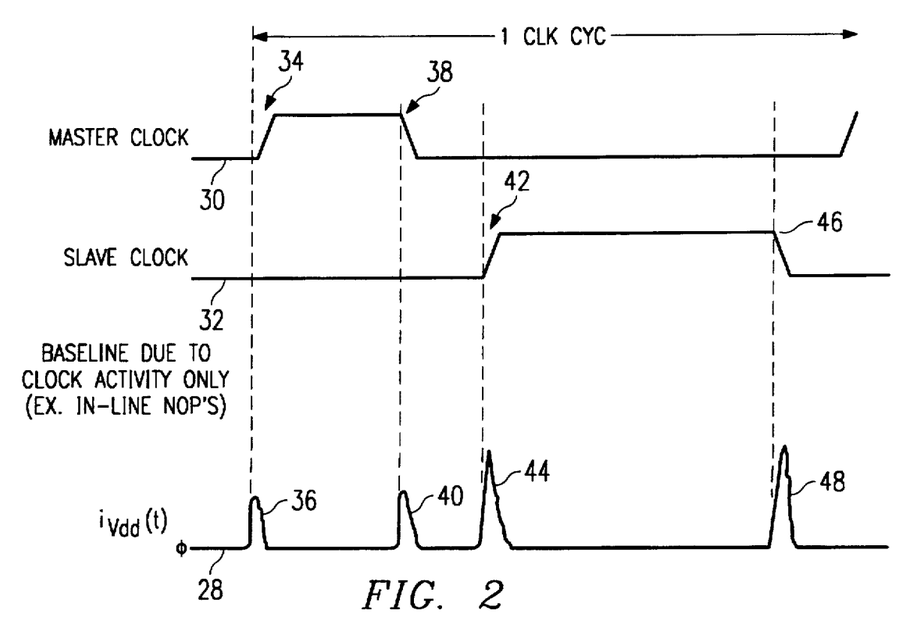
FIG. 2 is a signal diagram that shows baseline current drawn from the processor module of FIG. 1.

FIG. 2 is a diagram showing the current flow 28, $i_{v_{mn}}(t)$, for a module n, over time t, plotted against the waveform 30 of a master clock pulse and the waveform 32 of a slave clock pulse, during a single system clock cycle in which only NOP instructions are being executed. In other words, the module is exhibiting minimum switching behavior. The diagram may be generated using any of the conventional circuit simulation tools that provide a value for current flow, such as the Power Mill™ simulator tool and TurboWave™ graphical display tool, manufactured by the Synopsys Physical Tools Group, formerly EPIC Design Technology, Inc. As can be seen, at the rising edge 34 of the master clock waveform 30 a burst 36 of current $i_{v_{mn}}$ occurs, at the falling edge 38 of the master clock waveform 30 a burst 40 of current $i_{v_{mn}}$ occurs, at the rising edge 42 of the slave clock waveform 32 a burst 44 of current $i_{v_{mn}}$ occurs, and at the falling edge 46 of the slave clock waveform 32 a burst 48 of current $i_{v_{mn}}$ occurs. Since these current bursts are measured during a series of NOP instructions, which produce the minimum switching in the IC, they are considered representative of the switching activity in the module that occurs regardless of the instruction, and I refer to the energy they represent the baseline energy for the module.

Figure 3:
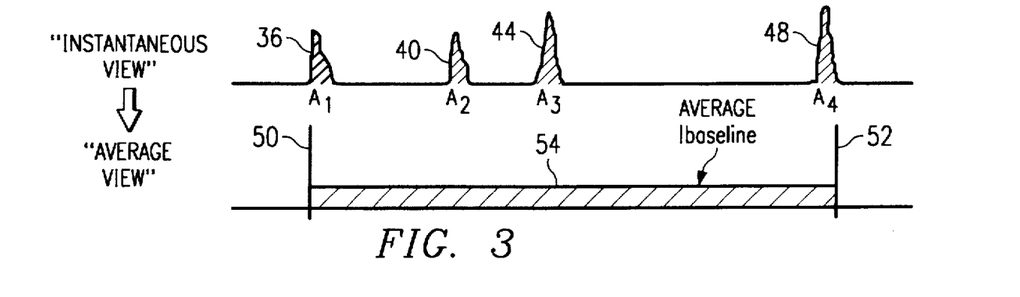
FIG. 3 is a signal diagram that shows the averaging of the baseline current of FIG. 2.

FIG. 3 is a diagram showing the conversion of the pulse waveform representation, or view, of the current burst waveforms 36, 40, 44, 48, to an average current representation, or view, for the single clock cycle. The area under the waveforms 36, 40, 44, 48, is summed and averaged over the clock cycle 50–52, to yield an average baseline current 54, $I_{BL}$. Thus, denominating the energy under waveform 36 as A1, denominating the energy under waveform 40 as A2, denominating the energy under waveform 44 as A3, and denominating the energy under waveform 48 as A4, the average current per clock cycle ("clockperiod") for this baseline state, $I_{AVG}$(NOP), is:

$$I_{AVG}(NOP) = I_{BL} = \frac{\sum A1 + A2 + A3 + A4}{clockperiod}.$$

Figure 4:
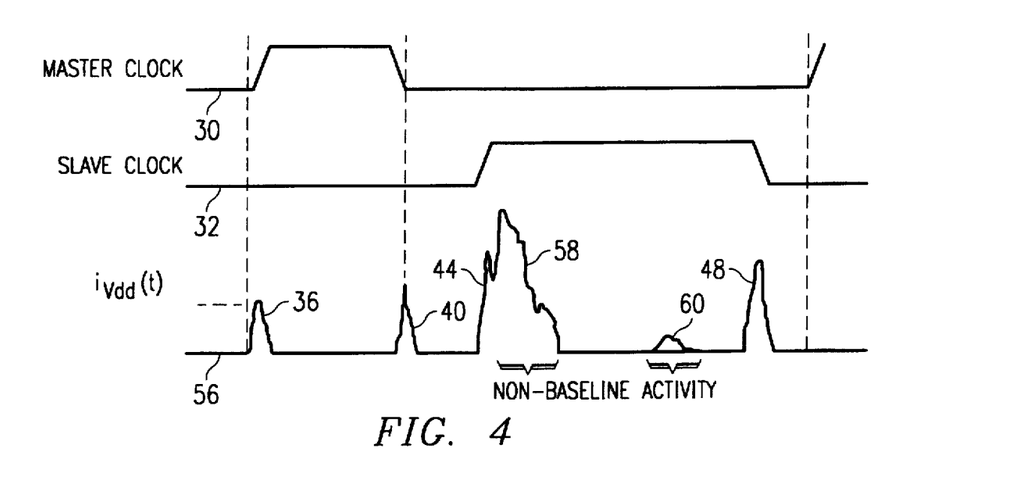
FIG. 4 is a signal diagram that shows non-baseline current drawn from the processor module of FIG. 1.

FIG. 4 is a diagram similar to FIG. 2, showing the current flow 56, $i_{v_{mn}}(t)$, for a module n, over time t, plotted against the waveform 30 of a master clock pulse and the waveform 32 of a slave clock pulse, during a single system clock cycle in which a non-NOP instruction is executed. As in FIG. 2, the baseline current burst waveforms 36, 40, 44, 48, can be seen, representing energy components A1, A2, A3 and A4. However, two additional current burst waveforms 58, 60, can be seen. These additional current burst waveforms 58, 60, represent non-baseline activity, having energy components A5, A6, respectively. The current flow 56 is typical for, e.g., the CPU module 12 (FIG. 1). The current burst waveform 58 appears after the energy burst 44 associated with the rising edge 42 of the slave clock waveform 32. The rising edge 42 of the slave clock waveform 32, in conventional master/slave latch methodology circuitry, provides the signals, latched in a given stage in the previous clock cycle, to the next stage for operation thereon. This triggers a burst of switching, which is shown by the appearance of current burst waveform 58. The current burst waveform 60 appears at the point in time when data, requested by the instruction dispatch unit ("IDU") within the CPU module 12 (FIG. 1), appears at the input of the IDU. In other words, the time lag of waveform 60 from waveform 44 reflects the latency for data retrieval to the IDU.

Figure 5:
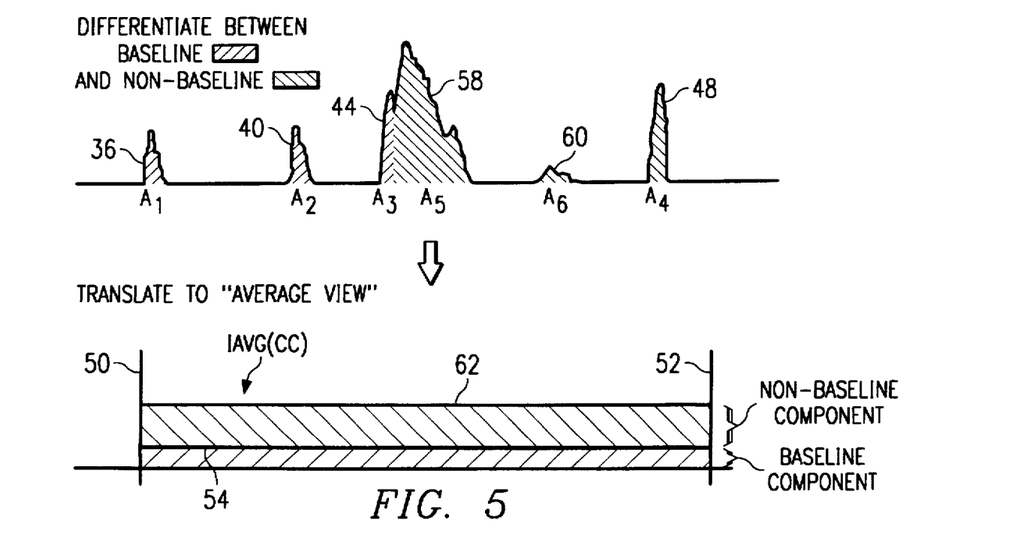
FIG. 5 is a signal diagram that shows the averaging of the baseline current of FIG. 4.

FIG. 5 is a diagram similar to that of FIG. 3, showing the conversion of the pulse waveform representation, or view, of the current burst waveforms 36, 40, 44, 48, 58, 60, to an average current representation, or view, for the single clock cycle. The baseline and non-baseline energy components are distinguished by cross hatching having different directions. Thus, baseline energy components A1, A2, A3 and A4, can be seen, and non-baseline energy components A5, A6, can be seen as well but with different cross-hatching. As in FIG. 3, the area under the waveforms 36, 40, 44, 48, is summed and averaged over the clock cycle 50–52, to yield the average baseline current 54, $I_{BL}$. In addition, the area under the waveforms 58, 60, is summed and averaged over the clock cycle 50–52, to yield an average non-baseline current 62, $I_{NBL}$. Thus, the total average current in this situation, $I_{AVG}$(NNOP), is the sum of the baseline current $I_{BL}$ and the non-baseline current $I_{NBL}$:

$$I_{AVG}(NNOP) = I_{BL} + I_{NBL} = \frac{\sum A1 + A2 + A3 + A4 + \sum A5 + A6}{clockperiod}.$$

Thus, in the practice of the preferred embodiment of the present invention, it is necessary to determine the average baseline current $I_{BL}$. This is always a constant for a given block of circuitry. Then, the average non-baseline current $I_{NB}$ is determined, and for a given sequence, or block, of instructions, the average baseline and non-baseline components are added to form the average currents for the current cycle.

In general, the non-baseline current $I_{NB}$ for a block of circuitry consists of multiple components, and determination of the values for this current can be quite complex, depending on the complexity of the logic function implemented in the given block. However, application of the inventive principles is straightforward, no matter what the function of the block, as will be seen from the description hereinbelow.

In some cases, the non-baseline components can be expressed in an absolute manner, i.e., based on the number of bits changing in input and/or output signals. In other cases, a more heuristic approach must be used which, while often less accurate, may be the only practical way to provide a reasonable estimate of current, and, hence, energy consumption.

The detailed steps in the method of the preferred embodiment will now be described. Derivation of actual algorithms for exemplary functional units will be presented, to illustrate the application of the principles of the present invention. Current values are obtained by running the Power Mill® simulator program, with parameter settings as indicated.

Figure 6A:
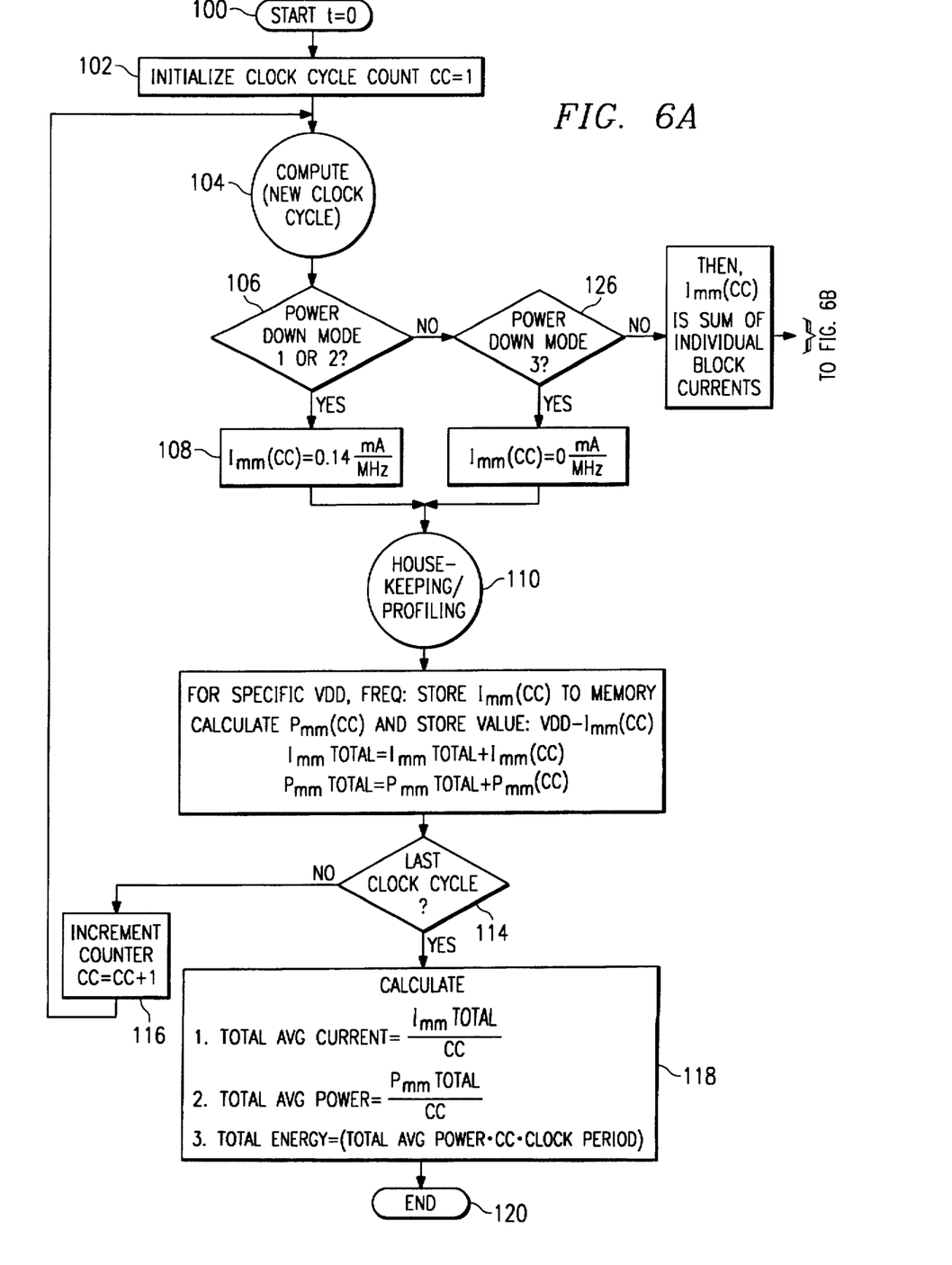
FIG. 6 is a flow chart showing the steps involved in the general method of the preferred embodiment of the present invention.
Figure 6B:
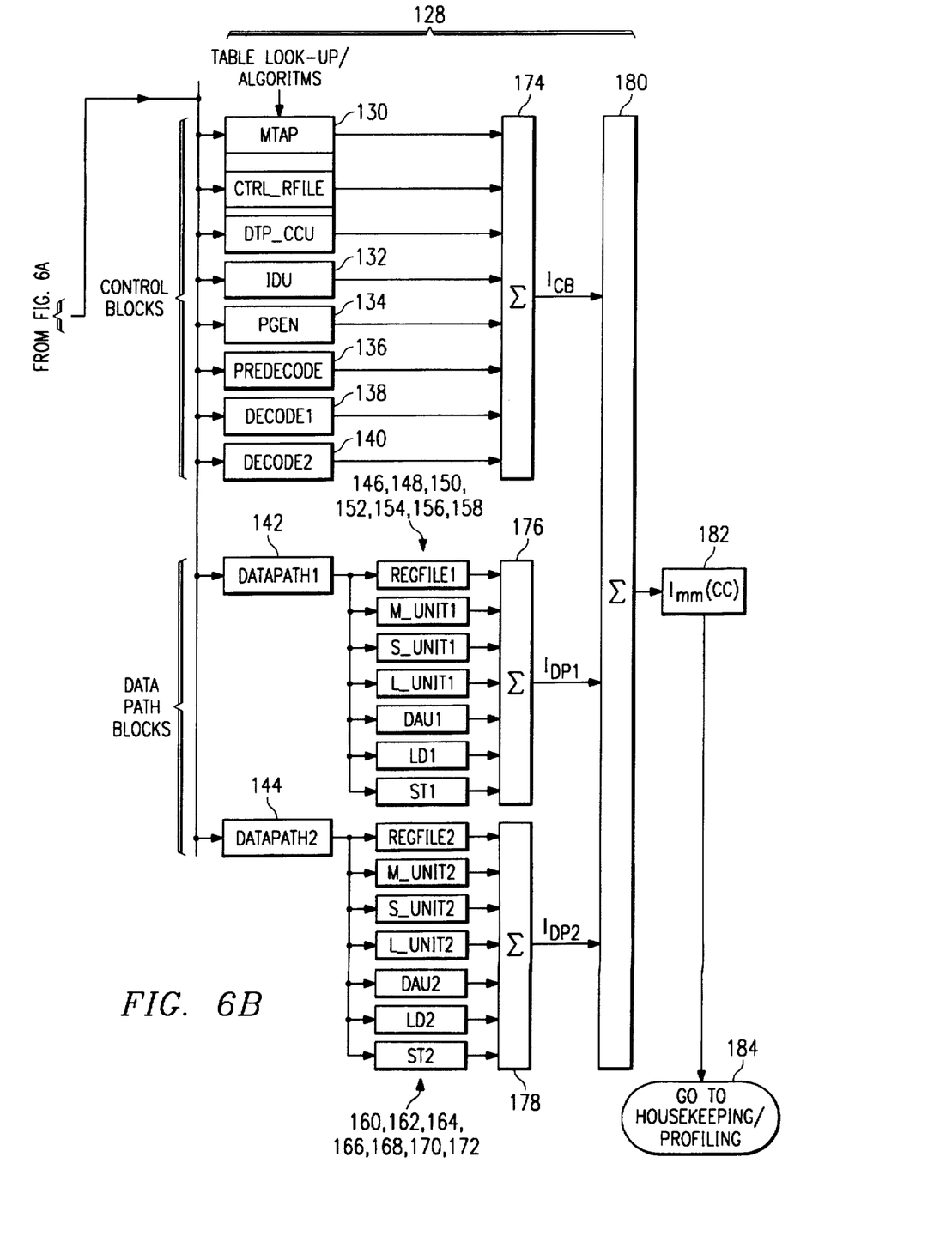

FIG. 6 is a flow chart showing the method of the preferred embodiment at a high level. The method is implemented in program code, that can be written by those of ordinary skill in the IC simulation tool art, once the principles of the invention, as described herein, are understood. The method of FIG. 6 provides the power consumption of the CPU 12. By the application of the principles described herein the ordinary practitioner can readily implement the method for other modules, as well. Values used in the method include $I_{CPU}$ and $P_{CPU}$, sometimes referred to as $I_{MM}$ and $P_{MM}$. $I_{CPU}$ is the total current drawn by the CPU 12, while $P_{CPU}$ is the total power consumed by the CPU 12.

The method starts 100 at time t=0. Clock cycle count ("cc") is initiated 102 to 1, cc=1. At this point, $I_{CPU}$ and $P_{CPU}$ are both 0. A new clock cycle is computed 104.

It is then determined whether the CPU 12 is in power down mode 1 or 2, 106. These are power down modes that are available in the TMS320C60 architecture. The significance for the present discussion of these power down modes, and power down mode 3, discussed below, is that in power down modes 1 and 2 some clocks are still active in the CPU 12 to support circuitry in certain control blocks, so that the CPU 12 can respond to interrupts. In power down mode 3, all clocks to the CPU 12 are disabled.

If the CPU 12 is in power down mode 1 or 2, then the average drawn by the CPU 12 for the current cycle, $I_{CPU}$(cc), is fixed at 0.14 mA/MHz 108. Then, housekeeping/profiling 110 is performed, followed by certain accumulation steps 112 being performed. For example, for the specified power supply voltage, VDD and clock frequency $I_{CPU}$(cc) is stored to memory. Then the power consumed by the CPU 12 for the current cycle, $P_{CPU}$(cc)is calculated, $P_{CPU}=V_{DD}*I_{CPU}$(cc), and stored to memory, as well. The cumulative $I_{CPU}$ total is then calculated, $I_{CPU}$ total=$I_{CPU}$ total+$I_{CPU}$(cc), and the result stored to memory. Likewise, the cumulative $P_{CPU}$ total is then calculated, $P_{CPU}$ total= $P_{CPU}$ total+$P_{CPU}$(cc), and the result stored to memory.

It is then determined whether the current clock cycle is the last clock cycle 114. If not, the clock counter is implemented 116, cc=cc+1, and the routine returns to step 104. If it is the last clock cycle, however, three sub-steps 118 are performed. The total average current is calculated, being $I_{CPU}$ total, divided by the total number of clock cycles. The total average power is also calculated, being $P_{CPU}$ total, divided by the total number of clock cycles. Finally, the total energy is calculated, being the total average power, times the number of clock cycles, times the clock period. The routine then ends 120.

If it is determined in step 106 that the CPU 12 is not in power down mode 1 or 2, it is then determined whether the CPU 12 is in power down mode 3, 122. If it is, then the average drawn by the CPU 12 for the current cycle, $I_{CPU}$(cc), is fixed at 0 mA/MHz 124. Then, the housekeeping/profiling 110 is performed, followed by accumulation steps 112, and so on, as before.

On the other hand, if it is determined that CPU 12 is not in power down mode 3, then $I_{CPU}$(cc) is the sum of the individual block currents 126, and a full power synthesis sequence 128 is begun. In the full power synthesis 128, a power determination algorithm for each module is performed. Thus, there can be seen in FIG. 6 the power determination algorithm blocks for the following modules: the control registers, etc. 130, the IDU 132, the PGEN 134, the PREDECODE 136, the DECODE 1 138, the DECODE 2 140, the DATAPATH 1 142, and the DATAPATH 2 144. Note that the DATAPATH 1 142 block is further decomposed into power algorithm blocks for: REGFILE 1 146, M-UNIT 1 148, S-UNIT 1 150, L-UNIT 1 152, DAU 1 154, LD1 156 AND ST1 158. Likewise, note that the DATAPATH 2 144 block is further decomposed into power algorithm blocks for: REGFILE 2 160, M-UNIT 2 162, S-UNIT 2 164, L-UNIT 2 166, DAU 2 168, LD2 170 AND ST2 172.

The results of the performance of algorithms 130, 132, 134, 136, 138 and 140 are summed 174, as are the results of the performance of the various algorithms for DATAPATH 1 176, and the results of the performance of the various algorithms for DATAPATH 2 178. In turn, the sums from steps 174, 176 and 178 are summed 180, and the resulting value for $I_{CPU}$(cc) 182 is then treated as above 184, by executing the housekeeping/profiling steps 110, etc.

After cycling the foregoing method though each instruction in the block of code under consideration, the accumulated values for $I_{CPU}$ total, $I_{CPU}$ total, total average current, total average power and total energy, provide the results of the test 118.

Various inventive techniques involved in generating the algorithms for the various functional blocks will now be described. The general approach involves a clock-cycle-by-clock-cycle summation algorithm using current data (mA/MHz) located in a look-up table, providing a programmable, configurable approach. The data in the table is process/technology dependent, and can be linearly scaled for different supply voltage, $V_{DD}$, and clock frequencies. The source of the data for the preferred embodiment is, as mentioned above, Power Mill simulation/characterization using module level transistor netlists with extracted parasitics. Note that the QuickVHDL™ tool, by Mentor Graphics Corporation, and Design Power™ tool, by Synopsys, Inc., may be used as well, as sources for data. In some cases, such tools may be preferable, for example for creating algorithms for processor peripherals such as serial ports, timers, cache control, and the like.

The algorithm is the result of an analysis of the instantaneous current for a clock cycle, which leads to the synthesis of a discrete average current estimate based on a summation of the individual baseline and non-baseline current components.

The first step in generating the algorithms is to group the functional units according to the primary power consumption dependencies. This is done by considering the physical design of the unit, and considering the function performed by each unit, the inputs and outputs of the unit, and how code execution, as a general matter, affects power consumption by the unit. A useful way of grouping, for example, is as a digital unit, memory unit, or linear unit. Digital units are, for example, control logic, buffers, I/O, multiplier, arithmetic logic unit ("ALU"), serial port, timer, interface logic, etc. Linear units are, for example, differential amplifiers, reference generators, resistor trees, current mirrors, etc.

For the CPU 12 under consideration, for example, it was found that the functional units can be separated into three groups, shown in Table 1 The units identified as DATAPATH 1 and DATAPATH 2 are the REGFILE 1 and its associated EUs, and REGFILE 2 and its associated EUs, respectively.

TABLE 1

| Group 1 | Group 2 | Group 3 |
| --- | --- | --- |
| PGEN | DATAPATH1 | CR |
| IDU | DATAPATH2 | DTP_CCU |
| PREDECODE | | MTAP |
| DECODE 1 | | |
| DECODE 2 | | |

Power consumption in the functional units in Group 1 is dependent primarily on how the code is written, i.e., the extent of parallelism in the code, slot assignment of instructions from one clock cycle to the next clock cycle, and the like. Power consumption in the functional units in Group 2 is dependent primarily on how many functional units are exercised during execution phases in the current clock cycle and the previous clock cycle. Finally, power consumption in the functional units in Group 3 is substantially constant, i.e., independent of the code, to within ten percent, which is considered acceptable.

Then, the average baseline components of the total average current are determined. For example, baseline components may arise due to clock switching, e.g., in many of the blocks in the CPU 12. They may also arise from pre-charging activity, e.g., in PLAs. They may arise from intentional DC paths, e.g., voltage dividers.

Then, the non-baseline components of the total average current are determined. These components are determined across the clock cycle. These components my be further segmented into unique intervals of non-baseline activity. Based on these components, a model is developed which quantifies the activity for each interval, wherein each interval represents a different component. The total average current is, then, the sum of all baseline and non-baseline components.

The application of the above methodology to the functional units in CPU 12 will now be explained in detail. Generally, the step of defining/distinguishing the block type by physical design and/or functionality results in an identification of factors that affect power consumption. This is shown clearly in FIG. 7, which shows the result of identifying the distinguishing factors for each of the major types of functional units in the IC 10. Note that all units include a baseline component, that may, depending upon the specific design of the unit, be a significant factor or not.

Figure 7:
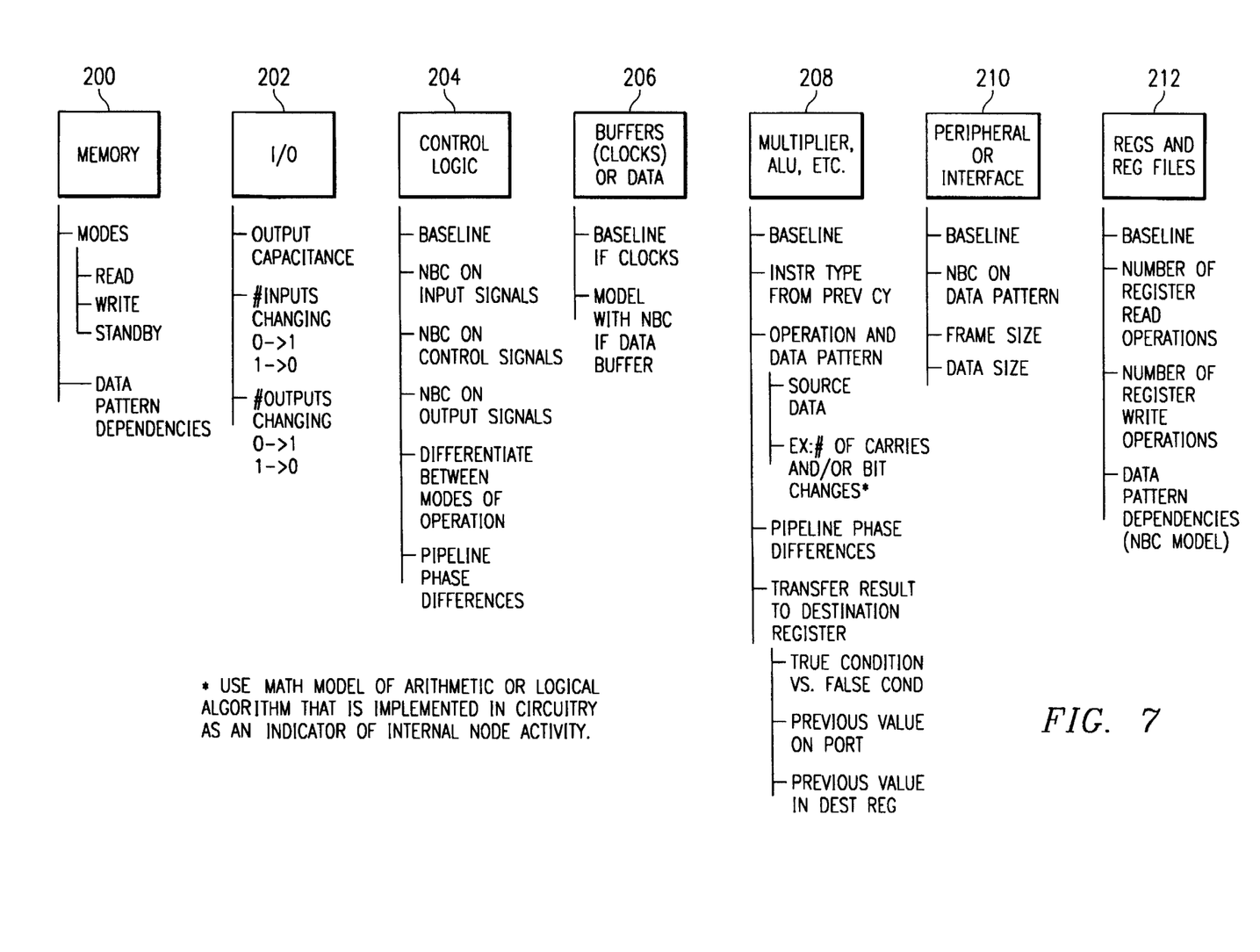
FIG. 7 is a diagram showing module typing considerations for principal power component determination.

Thus, power consumption for memory 200 is affected by the modes of operation, READ, WRITE and STANDBY. It is also affected by data pattern dependencies, e.g., the specific data values read or written, and the changes in such data values from cycle to cycle.

Power consumption for the I/O 202 is affected by the output capacitance, the number of inputs changing from 0 to 1 and 1 to zero, as well as the number of outputs changing from 0 to 1 and from 1 to zero.

Power consumption for control logic 204 is affected by the number of bits changing on the input signals, the number of bits changing on the control signals and the number of bits changing on the output signals. In addition, different modes of operation, such as receiving data versus processing data, have an affect on power consumption, as well. Pipeline phase differences also have an affect. Appendix 1 presents the role of the various control blocks and functional units for different pipeline phases of the six instruction types.

Power consumption for buffers, such as clock buffers and data buffers 206 is baseline only, if clock buffers, and is affected by the number of bits changing as well, if data buffers.

Power consumption for multipliers, ALUs, etc. 208, is affected by the instruction type from the previous cycle, by the current operation and the data pattern, including the source data for the current operation, as well as factors specific to the particular current operation. This latter component is derived using a math model of the arithmetic or logical algorithm that is implemented in the circuitry, as an indicator of internal node activity. For example, for a functional unit that executes ADD operations, factors include the number of carries, and/or bit changes.

Power consumption for peripherals and interfaces 210, is affected by the number of bit changes of the data pattern, frame size and data size. A frame is a group of data bits that are handled by a particular peripheral or interface.

Power consumption for registers and register files 212, is affected by the number of register READ operations, the number of register WRITE operations, and also by data pattern dependencies (i.e., number of bit changes).

In detail, turning first to Group 1, the derivation of the algorithm for the IDU will now be described, In the IDU, the input signals for non-baseline current activity determination are the program data bus input, from Program Memory. As mentioned above, the CPU 12 is a VLIW core, capable of executing up to eight instructions per clock cycle. The bus for Program Memory fetch is eight 32-bit words wide, to permit a fetch of eight 32-bit instructions in a single cycle.

The output signals for the IDU are the eight instruction bus to the PDU. In the TMS320C60 CPU 12, a parallel, or "p", bit is stripped from each instruction. Therefore, these instructions are only 31 bits wide as output. Also output from the IDU are the Program Address Strobe, for strobing the address to Program Memory, and the Program Data Strobe, for strobing data transfer from Program Memory.

The following data, in Table 2 are observed using the Power Mill simulator program. Data are in milliamps, "mA". Data are provided for the IDU, and for the CPU 12 as a whole, to permit a determination of the IDU current as a percentage of the total CPU 12 current.

In column 6, the simulation value for current drawn during execution of a block of code implementing a single sample finite impulse response ("SS_FIR") calculation is provided. The kernel of this block of code contains a single cycle loop that contains an execute packet of eight instructions which perform the multiply-accumulate ("MAC") operations. This inside loop is executed with eight instructions in parallel, representing an effective MIPs rate of 1600 (8 instructions in parallel) for the CPU 12. In addition, since this is a single sample FIR calculation, the data value does

TABLE 2

| Col. 1 | Col. 2 OBSERVED | | Col. 3 NOP | Col. 4 PM_DT | Col. 5 FSM loop | Col. 6 SS_FIR kernel | Col. 7 RB_FIR 1st 50 |
|---|---|---|---|---|---|---|---|
|  | MIN | MAX | (5 cy) | (80 cy) | (34 cy) | (18 cy) | cy of t.c. |
| IDU | 18.6 | 52.96 | 20.7 | 25.85 | 31.29 | 24.6 | 31.73 |
| CPU 12 | 100.37 | 355.48 | 105 | 122.3 | 165 | 164.3 | 220.1 |
| % CPU |  |  | 20% | 21% | 19% | 15% | 14% |

In column 2, minimum and maximum current simulation values for one cycle, observed over all test cycles, are provided, to show the absolute range of current behavior for the unit. In columns 3 through 7, the instruction execution is begun, and allowed to execute over 20 cycles or more, to assure full loading of the pipeline, and "steady-state" conditions for the condition being examined.

Now, it will be recalled that the Group 1 units' power consumption is dependent primarily on how the code is written, i.e., the extent of parallelism in the code, etc. The code blocks run to produce the data in Table 2 were selected to provide current values that demonstrate the current drawn for a representative cross-section of types of coding, from which the algorithm will be derived. Five test cases were selected: NOP, PM_DT, FSM, SSFIR and RBFIR. A sixth test case was used to understand the effect of varying degrees of instruction parallelism on different blocks for different pipeline phases.

In column 3, the simulation value for current drawn during a series of NOP instructions, averaged over 5 cycles to a single cycle is provided. Averaging over 5 cycles assures an accurate average value, that averages random cycle-to-cycle variations. This operation provides the baseline current consumption for the unit, 20.7 mA per cycle, which can be rounded to 21 mA per cycle.

In column 4, the simulation value for current drawn during a register file data transfer ("PM_DT") test case, averaged over 80 cycles, is provided. This operation is an operation performed by a block of code that effects a data transfer between register files. This block of code is executed in execute packets containing one to three instructions. Assuming the CPU 12 is running at a clock frequency of 200 MHz, this represents an effective MIPs rate of 200–600. Averaging over 80 cycles assures that the full block of code is completely executed through the pipeline, for accuracy. The average current per cycle is 25.85 mA.

In column 5, the simulation value for current drawn during execution of a finite state machine ("FSM") block of code is provided. This block of code is executed in execute packets containing one to four instructions. Again, assuming the CPU 12 is running at a clock frequency of 200 MHz, this represents an effective MIPs rate of 400–800. The average current per cycle is 31.29 mA.

not change, so toggle activity within the unit is relatively low. The average current per cycle is 24.6 mA.

Finally, in column 7, the simulation value for current drawn during execution of a block of code implementing a real-block finite impulse response ("RB_FIR") calculation is provided. As with the SS_FIR test case, the kernel of this block of code contains an inside loop that includes execute packets which implement the MAC operations by implementing adds and multiplies in both data paths in parallel. This inside loop is also executed with eight instructions in parallel, representing an effective MIPs rate of 1600. However, since real data is processed, toggle activity within the unit is relatively high. The average current per cycle is 31.73 mA.

Now, from the foregoing data the algorithm for the IDU may be derived. The algorithm is provided below, as a listing of C-code-like statements. Comments are provided at the end of the listing below.

| | |
|---|---|
| Line 1 | BEGIN |
| Line 2 | Iidu = $I_{BL}$ = 21 mA |
| Line 3 | If PAS = PDS = 0 |
| Line 4 | IF MCNOP |
| Line 5 | Iidu = 28 mA |
| Line 6 | ELSE IF NOP |
| Line 7 | Iidu = 20.7 mA |
| Line 8 | ELSE |
| Line 9 | Iidu = 21.4 mA |
| Line 10 | IF PDS = PAS = 1 |
| Line 11 | IF in (cc-1) both PDS & PAS transitioned 0 to 1 |
| Line 12 | Iidu = 32 mA |
| Line 13 | IF in (cc-1) PAS stayed 0, but PDS transitioned 0 to 1 |
| Line 14 | Iidu = 38 mA |
| Line 15 | ELSE |
| Line 16 | IF no change in exec packet in cc-1) |
| Line 17 | IF first cycle |
| Line 18 | Iidu = 20.5 mA |
| Line 19 | ELSE |
| Line 20 | Iidu = 19 mA |
| Line 21 | IF change in exec packet in (cc-1) |
| Line 22 | Iidu = 19 mA + [NBC(cc-1) * mA/BC(cc-1)] + [NBC(cc) * 0.01 mA/BC] |
| Line 23 | where mA/BC(cc-1) equals: |
| Line 24 | 0.30 mA for NBC less than 55 |

-continued

| | |
|---|---|
| Line 25 | 0.25 mA for 55 <= NBC <= 59 |
| Line 26 | 0.23 mA for 60 <= NBC <= 64 |
| Line 27 | 0.19 mA for 65 <= NBC <= 69 |
| Line 28 | 0.22 mA for 70 <= NBC <= 74 |
| Line 29 | 0.19 mA for 75 <= NBC <= 79 |
| Line 30 | 0.15 mA for 80 <= NBC <= 84 |
| Line 31 | 0.18 mA for 85 <= NBC <= 89 |
| Line 32 | 0.18 mA for NBC >= 90 |
| Line 33 | IF PAS = PDS = 1 and PAS = PDS = 0–>1 |
| Line 34 | IF # instr. In exec packet < 3 |
| Line 35 | Iidu = 26 mA |
| Line 36 | ELSE |
| Line 37 | Iidu = 28 mA |
| Line 38 | IF PAS = PDS = 0 and PDS = PAS = 1 –> 0 |
| Line 39 | IF NBC(cc-1) ! = 0 |
| Line 40 | Iidu = 19 mA + [NBC(cc-1) * mA/BC(cc-1)] + [NBC(cc) * 0.01 mA/BC] |
| Line 41 | where mA/BC(cc-1) equals: |
| Line 42 | 0.30 mA for NBC less than 55 |
| Line 43 | 0.25 mA for 55 <= NBC <= 59 |
| Line 44 | 0.23 mA for 60 <= NBC <= 64 |
| Line 45 | 0.19 mA for 65 <= NBC <= 69 |
| Line 46 | 0.22 mA for 70 <= NBC <= 74 |
| Line 47 | 0.19 mA for 75 <= NBC <= 79 |
| Line 48 | 0.15 mA for 80 <= NBC <= 84 |
| Line 49 | 0.18 mA for 85 <= NBC <= 89 |
| Line 50 | 0.18 mA for NBC >= 90 |
| Line 51 | ELSE |
| Line 52 | Iidu = 45 mA |
| Line 53 | IF PDS = 0, PAS = 0–>1 |
| Line 54 | Iidu = 22.5 mA |
| Line 55 | IF PAS = 1, PDS = 0–>1 |
| Line 56 | Iidu = 26 mA |
| Line 57 | ELSE |
| Line 58 | Iidu = 24 mA |
| Line 59 | END |

Note that "cc–1" stands for "the previous cycle, "exec packet" stands for "execute packet," and "NBC" stands for "number of bits changing." Also, "mA/BC(cc–1)" stands for the average current per bit changing in the previous cycle. Likewise, "mA/BC(cc)" stands for the average current per bit changing in the current cycle.

The block of lines 3 through 9 represent the case where neither PAS nor PDS are changing, and both are static low. Thus, no new fetch packets are being fetched, i.e., the IDU is not receiving new data from memory.

The block of lines 10 through 32 represent the case where neither PAS nor PDS are changing, and both are static high. In this case, a new fetch packet is fetched to the IDU in every cycle. This is the extreme case of maximum parallel instruction execution.

Relevant comments for selected lines for the above two cases are as follows. Line 3 represents the condition where the IDU is not receiving data from memory. In line 4, MCNOP stands for multi-cycle NOP, which is an instruction that is part of the CPU 12 instruction set. Line 10 represents the condition where there are no transitions in PAS/PDS. Line 16 represents the condition where there is no change in the execute packet from the previous cycle. Line 21 represents the condition where a different execute packet from that of the previous cycle is being operated on in the current cycle. Line 33 represents the condition where PAS/PDS transition from low to high. Line 38 represents the condition where PAS/PDS transition from high to low. Line 39 represents the condition where a different fetch packet is received from Program Memory.

The step in line 22 illustrates quite clearly the relative average current contributions from the baseline condition, A1, A2, A3, A4, and the non-baseline contributions A5, A6 (FIG. 5). The value of 19 mA represents the baseline current. The term [NBC(cc–1)*mA/BC(cc–1)] represents the A5 average current contribution. This represents the current drawn due to bits changes from the previous cycle, as described above in connection with the description of A5 in FIG. 5. Similarly, the term [NBC(cc)*0.01 mA/BC] represents the A6 average current contribution. This represents the current drawn due to the arrival of new data in the present cycle from the Program Memory, which depends on the number of bits changing as a result of the arrival of this new data, as described above in connection with the description of A6 in FIG. 5.

Thus, the application of the principles of the present invention provide a way of determining the power consumption of an integrated circuit, on a module-by-module and cycle-by-cycle basis, providing visibility into the integrated circuit not heretofore provided. All significant power contribution variables are modeled in the algorithms, and their sensitivities are thereby tracked. Very high accuracy is possible, therefore, by the application of the principles of the present invention in power modeling.

Although the present invention and its advantages have been described in detail, it should be understood that various changes, substitutions and alterations can be made herein without departing from the spirit and scope of the invention as defined by the appended claims.

| Begin Summary | |
|---|---|
| Types of instructions on the c6x: | |
| 1. ISC | single cycle instruction |
| 2. IMPY | integer multiply instructions |
| 3. LD | load instructions |
| 4. ST | data store instructions |
| 5. STP | program store instructions. |
| 6. BRANCH. | branch instructions |

Note:
The following cases will be covered in detail later:
Interrupts are a special version of the branch.
"STP" instructions were not discussed.
CONDITIONAL execution was briefly discussed.

C6x Pipeline Phases:

-continued

PG = Program Address Generate
PS = Program Address Send
PW = Program Wait
PD = Program Data
DP = Dispatch
DC = Decode
E1 = Execute 1
.
.
.
E7 = Execute 7

Key:
  In the charts below, an "X" indicates that the specific control block or (datapath blocks) must perform tasks for the specific pipeline phase. The letter following the "X" corresponds to a note which briefly describes task.

Comments:
  The "decode" control block is used to indicate decode1 and decode2 in a general case.
  The same applies to DP for DP1 and DP2.

1. ISC instructions.

These instructions use phases PG through E2 of the pipeline.

| CONTROL BLOCK | PIPELINE PHASE | | | | | | | |
|---|---|---|---|---|---|---|---|---|
| | PG | PS | PW | PD | DP | DC | E1 | E2 |
| 1. PGEN | Xa | Xb | | | | | | |
| 2. IDU | | | | Xc | Xd | | | |
| 3. PREDECODE | | | | | Xe | | | |
| 4. DECODE | | | | | | Xf | Xg | Xh |
| 5. CTRL_RFILE | | | | | | Xj | | |
| 6. DTP_CCU | | | | | | | | |
| 7. MTAP | | | | | | | | |
| 8. DP | | | | | | | Xi | |

Notes:
  a: PGEN generates the program address
  b. PGEN sends the address out to MM boundary. PDS/PAS Strobes active.
  c. IDU receives program data
  d. IDU performs dispatch tasks. (decides which side of datapath/decode)
  e. PREDECODE latches data calculated by IDU in SRLs.
  f. DECODE decodes the instruction (packet)
  g. DECODE controls execution of instruction (packet) in DP Funct. Units.
  h. DECODE generates NOP and 8 "FUD" signals.
  i. DP units execute the instruction (packet) - - - actual DP units used depends on the specific instructions in the packet.
  j. Any writes or reads to registers in CNTRL_RFILE occur here.

2. IMPY instructions

These instructions use phases PG through E2 of the pipeline.

| CONTROL BLOCK | PIPELINE PHASE | | | | | | | |
|---|---|---|---|---|---|---|---|---|
| | PG | PS | PW | PD | DP | DC | E1 | E2 |
| 1. PGEN | Xa | Xb | | | | | | |
| 2. IDU | | | | Xc | Xd | | | |
| 3. PREDECODE | | | | | Xe | | | |
| 4. DECODE | | | | | | Xf | Xg | Xh |
| 5. CTRL_RFILE | | | | | | | | |
| 6. DTP_CCU | | | | | | | | |
| 7. MTAP | | | | | | | | |
| 8. DP (REGFILE) (M-UNIT) | | | | | | | Xi | Xj |

Notes:
  a: PGEN generates the program address
  b. PGEN sends the address out to MM boundary. PDS/PAS Strobes active.
  c. IDU receives program data
  d. IDU performs dispatch tasks. (decides which side of datapath/decode)
  e. PREDECODE latches data calculated by IDU in SRLs.
  f. DECODE decodes the instruction (packet)
  g. DECODE controls execution of instruction (packet) in DP Func. Units.
  h. DECODE generates NOP and 8 "FUD" signals and latches the destination address
  i. DP units execute the instruction (packet)
  j. DP units execute the instruction (packet)

3. LD instructions

These instructions use phases PG through E5 of the pipeline.
CONTROL                              PIPELINE PHASE -continued

| BLOCK | PG | PS | PW | PD | DP | DC | E1 | E2 | E3 | E4 | E5 |
|---|---|---|---|---|---|---|---|---|---|---|---|
| 1. PGEN | Xa | Xb | | | | | | | | | |
| 2. IDU | | | | Xc | Xd | | | | | | |
| 3. PREDECODE | | | | | Xe | | | | | | |
| 4. DECODE | | | | | | Xf | Xg | Xh | Xj | Xk | Xm |
| 5. CTRL_RFILE | | | | | | | | | | | |
| 6. DTP_CCU | | | | | | | | | | | |
| 7. MTAP | | | | | | | | | | | |
| 8. DP | | | | | | | | | | | |
| (REGFILE) | | | | | | | | | | | Xn |
| (DAU) | | | | | | | | | Xi | | |
| (LD) | | | | | | | | | | Xl | Xo |

Notes:
- a: PGEN generates the program address
- b: PGEN sends the address out to MM boundary. PDS/PAS Strobes active.
- c: IDU receives program data
- d: IDU performs dispatch tasks. (decides which side of datapath/decode)
- e: PREDECODE latches data calculated by IDU in SRLs.
- f: DECODE decodes the instruction (packet)
- g: DECODE controls execution of instruction (packet) in DP Funct. Units.
- h: DECODE generates NOP and 8 "FUD" signals and latches the destination address
- i: (DP) DAU unit sends address to MM boundary
- j: DECODE
- k: DECODE controls activity in DP
- l: (DP) LD unit latches received data
- m: DECODE controls data transfer activity in DP
- n: (DP) LD sends data to REGFILE
- o: (DP) REGFILE receives data from LD.

4. ST instructions

These instructions use phases PG through E2 of the pipeline.

| CONTROL BLOCK | PG | PS | PW | PD | DP | DC | E1 | E2 |
|---|---|---|---|---|---|---|---|---|
| 1. PGEN | Xa | Xb | | | | | | |
| 2. IDU | | | | Xc | Xd | | | |
| 3. PREDECODE | | | | | Xe | | | |
| 4. DECODE | | | | | | Xf | Xg | Xh |
| 5. CTRL_RFILE | | | | | | | | |
| 6. DTP_CCU | | | | | | | | |
| 7. MTAP | | | | | | | | |
| 8. DP | | | | | | | | |
| (ST) | | | | | | | | Xi |
| (DAU) | | | | | | | | Xj |

Notes:
- a: PGEN generates the program address
- b: PGEN sends the address out to MM boundary. PDS/PAS Strobes are active.
- c: IDU receives program data
- d: IDU performs dispatch tasks. (decides which side of datapath/decode)
- e: PREDECODE latches data calculated by IDU in SRLs.
- f: DECODE decodes the instruction (packet)
- g: DECODE controls execution of instruction (packet) in DP Funct. Units.
- h: DECODE generates NOP and 8 "FUD" signals and R/W line driven low.
- i: (DP) ST unit sends data to MM boundary
- j: (DP) DAU sends address to MM boundary and also the byte enables.

5. BRANCHES

These instructions use phases PG through E7 of the pipeline.

| CONTROL BLOCK | PG | PS | PW | PD | DP | DC | E1 (PG) | E2 (PS) | E3 (PW) | E4 (PD) | E5 (DP) | E6 (DC) | E7 (E1) |
|---|---|---|---|---|---|---|---|---|---|---|---|---|---|
| 1. PGEN | Xa | Xb | | | | Xg | Xh | Xi | Xj | Xk | | | |
| 2. IDU | | | | Xc | Xd | | Xl | Xm | Xn | Xo | Xp | | |
| 3. PREDECODE | | | | | Xe | | | | | | Xq | | |
| 4. DECODE | | | | | | Xf | Xr | Xs | | | | Xu | Xv |
| 5. CTRL_RFILE | | | | | | | | | | | | | |
| 6. DTP_CCU | | | | | | | | | | | | | |
| 7. MTAP | | | | | | | | | | | | | |
| 8. DP | | | | | | | | | | | | | Xw |

Notes:
- a: PGEN generates the program address
- b: PGEN sends the address out to MM boundary. PDS/PAS Strobes are active.
- c: IDU receives program data
- d: IDU performs dispatch tasks. (decides which side of datapath/decode)

-continued

| | |
|---|---|
| e. | PREDECODE latches data calculated by IDU in SRLs. |
| f. | DECODE decodes the instruction (packet) |
| g,h,i,j. | PGEN calculating 4 back to back PC values (Program Bus changes 4 cycles in a row) for three fetch packets after the branch. |
| h,i,j,k. | PGEN drives PAB address out to MM boundary. |
| l,m,n,o,p | IDU controls the PGEN Activity in E1–E5. |
| m | IDU generates PAS/PDS strobes at MM boundary for branch target. |
| q. | PREDECODE predecodes the branch target. |
| r. | DECODE (what is decode block doing here?) |
| s. | DECODE (what is decode block doing here?) |
| u. | DECODE decodes the target. |
| v. | DECODE controls execution of target in DP Funct. Units. |
| w. | DP executes the target |

End Summary

Begin "Instruction to Functional Unit Mapping" Chart

| L-unit | M-unit | S-unit | DAU | LD | ST |
|---|---|---|---|---|---|
| ABS | MPY | ADD | ADD | LD mem | ST mem |
| ADD | SMPY | ADDK | ADDA | LD mem (long) | ST mem (long) |
| AND | | ADD2 | SUB | | |
| CMPEQ | | AND | SUBA | | |
| CMPGT | | Bcond disp | | | |
| CMPGTU | | B IRP | | | |
| CMPLT | | B NRP | | | |
| CMPLTU | | B reg | | | |
| LMBD | | CLR | | | |
| NORM | | EXT | | | |
| OR | | EXTU | | | |
| SADD | | MVK | | | |
| SSUB | | MVKH | | | |
| SUB | | OR | | | |
| SUBC | | SET | | | |
| XOR | | SHL | | | |
| | | SHR | | | |
| | | SHRU | | | |
| | | SSHL | | | |
| | | STP | | | |
| | | SUB | | | |
| | | SUB2 | | | |
| | | XOR | | | |

End "Instruction to Functional Unit Mapping" Chart
End of Message

What is claimed is:

1. A method for determining the power consumption, resulting from execution of a block of code, of an integrated circuit that includes a processor module and one or more other circuit modules, comprising the steps of:

storing a set of average current values for each of said modules, for a predetermined plurality of conditions having an effect on power consumption of said module, for each instruction in the instruction set of said processor module;

for each module, for each instruction in a block of code to be executed on said processor module, testing said instruction to determine which of said conditions exist for said instruction, for each processor cycle;

retrieving one of said average current values for each condition so tested that is met; and adding said average current values so retrieved.

2. A method for determining power consumption as in claim 1, wherein said step of adding is performed by accumulating said average current values so retrieved.

3. A method for determining power consumption as in claim 1, further including, in said step of providing a set of average current values, the step of providing a set of baseline average current values that are stored for a module for retrieval for all cycles when said module is powered to operate.

4. A method for determining power consumption as in claim 1, wherein said conditions include conditions for a memory module.

5. A method for determining power consumption as in claim 4, wherein two types of said conditions for said memory module are provided, a first type relating to the memory instruction mode, and a second type relating to data pattern dependencies.

6. A method for determining power consumption as in claim 1, wherein said conditions include conditions for an input/output ("I/O") module.

7. A method for determining power consumption as in claim 6, wherein three types of said conditions for said input/output module are provided, a first type relating to output capacitance of said I/O module, a second type relating to the number of inputs of said I/O module that change during a cycle for an I/O instruction, and a third type relating to the number of outputs of said I/O module that change during a cycle for an I/O instruction.

8. A method for determining power consumption as in claim 1, wherein said conditions include conditions for a control logic module for said processor module.

9. A method for determining power consumption as in claim 8, wherein said integrated circuit includes a pipeline having a plurality of phases, and wherein three types of said conditions for said control logic module are provided, a first type relating to the number of bits changing on signal lines of said module, a second type relating to differentiating between modes of operation of said control module, and a third type relating to pipeline phase differences during a cycle.

10. A method for determining power consumption as in claim 1, wherein said conditions include conditions for a data buffer module.

11. A method for determining power consumption as in claim 10, wherein a baseline average current value is provided when a clock signal is provided to said data buffer module, and wherein said conditions for said data buffer module relate to the number of bits changing in said data buffer module during a cycle.

12. A method for determining power consumption as in claim 1, wherein said conditions include conditions for functional unit modules for said processor module.

13. A method for determining power consumption as in claim 12, wherein four types of said conditions for said functional unit modules are provided, a first type relating to what instruction executed in the cycle previous to a cycle under test, a second type relating to operational and data pattern factors for said functional unit and an instruction, a third type relating to pipeline phase differences during a cycle, and a fourth type relating to factors involved in the transfer of a result to a register during a cycle.

14. A method for determining power consumption as in claim 13, wherein said conditions include conditions for peripheral and interface modules for said processor module.

15. A method for determining power consumption as in claim 14, wherein two types of said conditions for said peripheral and interface modules are provided, a first type relating to the number of bits changing on signal lines of said peripheral and interface modules during a cycle, and a second type relating to the size of data transferred by said peripheral and interface modules during a cycle.

16. A method for determining power consumption as in claim 1, wherein said conditions include conditions for register modules for said processor module.

17. A method for determining power consumption as in claim 16, wherein three types of said conditions for said register modules are provided, a first type relating to the number of read operations done during a cycle, a second type relating to the number of write operations done during a cycle, and a third type relating to the number of bits changing during a cycle.

18. A method for determining power consumption as in claim 1, wherein said average current values are stored as a list.

19. A method for determining power consumption as in claim 1, wherein said average current values are stored as a values embedded in code.

20. A method for determining the power consumption, from execution of a block of code, of an integrated circuit that includes a processor module and one or more other circuit modules, comprising the steps of:

providing a simulation tool that executes a model of each module, for each instruction executed in the instruction set of said processor module, and generates and stores a set of average current values for each module, for a predetermined plurality of sets of conditions selected for power consumption effect on the module and associated with said module, for each cycle, in sequence, of a block of code executing on said processor module;

providing a current modeling program that tests a sequence of instructions for said set of conditions, and retrieves one of said average current values for each condition so tested that is met;

providing a block of code, comprising a sequence of instructions; and determining the power consumed by the execution of said block of code by executing said current modeling program on said block of code, to retrieve appropriate ones of said average current values, for each module, resulting from the execution of said block of code, for each cycle of operation of said processor module, and adding said average current values so retrieved.

21. A method for determining power consumption as in claim 20, wherein said step of adding is performed by accumulating said average current values so retrieved.

22. A method for determining power consumption as in claim 20, wherein wherein said simulation tool performs simulation and characterization using module level transistor netlists with extracted parasitics.

23. A method for determining power consumption as in claim 20, wherein.

24. A method for determining power consumption as in claim 20, wherein said average current values are stored as a list.

25. A method for determining power consumption as in claim 20, wherein said average current values are stored as a values embedded in code.

26. A method for determining power consumption as in claim 20, further including, in said step of providing a set of average current values, the step of providing a set of baseline average current values that are stored for a module for retrieval for all cycles when said module is powered to operate.

27. A method for determining power consumption as in claim 20, wherein said conditions include conditions for a memory module.

28. A method for determining power consumption as in claim 27, wherein two types of said conditions for said memory module are provided, a first type relating to the memory instruction mode, and a second type relating to data pattern dependencies.

29. A method for determining power consumption as in claim 20, wherein said conditions include conditions for an input/output ("I/O") module.

30. A method for determining power consumption as in claim 29, wherein three types of said conditions for said input/output module are provided, a first type relating to output capacitance of said I/O module, a second type relating to the number of inputs of said I/O module that change during a cycle for an I/O instruction, and a third type relating to the number of outputs of said I/O module that change during a cycle for an I/O instruction.

31. A method for determining power consumption as in claim 20, wherein said conditions include conditions for a control logic module for said processor module.

32. A method for determining power consumption as in claim 31, wherein said integrated circuit includes a pipeline having a plurality of phases, and wherein three types of said conditions for said control logic module are provided, a first type relating to the number of bits changing on signal lines of said module, a second type relating to differentiating between modes of operation of said control module, and a third type relating to pipeline phase differences during a cycle.

33. A method for determining power consumption as in claim 20, wherein said conditions include conditions for a data buffer module.

34. A method for determining power consumption as in claim 33, wherein a baseline average current value is provided when a clock signal is provided to said data buffer module, and wherein said conditions for said data buffer module relate to the number of bits changing in said data buffer module during a cycle.

35. A method for determining power consumption as in claim 20, wherein said conditions include conditions for functional unit modules for said processor module.

36. A method for determining power consumption as in claim 35, wherein four types of said conditions for said functional unit modules are provided, a first type relating to what instruction executed in the cycle previous to a cycle under test, a second type relating to operational and data pattern factors for said functional unit and an instruction, a third type relating to pipeline phase differences during a cycle, and a fourth type relating to factors involved in the transfer of a result to a register during a cycle.

37. A method for determining power consumption as in claim 36, wherein said conditions include conditions for peripheral and interface modules for said processor module.

38. A method for determining power consumption as in claim 37, wherein two types of said conditions for said peripheral and interface modules are provided, a first type relating to the number of bits changing on signal lines of said peripheral and interface modules during a cycle, and a second type relating to the size of data transferred by said peripheral and interface modules during a cycle.

39. A method for determining power consumption as in claim 20, wherein said conditions include conditions for register modules for said processor module.

40. A method for determining power consumption as in claim 39, wherein three types of said conditions for said register modules are provided, a first type relating to the number of read operations done during a cycle, a second type relating to the number of write operations done during a cycle, and a third type relating to the number of bits changing during a cycle.

* * * * *